US008379939B1

(12) United States Patent
Bourdev et al.

(10) Patent No.: US 8,379,939 B1
(45) Date of Patent: Feb. 19, 2013

(54) EFFICIENT AND SCALABLE FACE RECOGNITION IN PHOTO ALBUMS

(75) Inventors: Lubomir Bourdev, San Jose, CA (US); Alexandre S. Parenteau, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 742 days.

(21) Appl. No.: 12/555,216

(22) Filed: Sep. 8, 2009

(51) Int. Cl.
*G06K 9/00* (2006.01)
*G06K 9/62* (2006.01)

(52) U.S. Cl. ........................................ 382/118; 382/225

(58) Field of Classification Search .................. None
See application file for complete search history.

(56) References Cited

U.S. PATENT DOCUMENTS

| | | | | |
|---|---|---|---|---|
| 2004/0264780 A1* | 12/2004 | Zhang et al. | .................. | 382/224 |
| 2005/0144189 A1* | 6/2005 | Edwards et al. | .............. | 707/102 |
| 2008/0298766 A1* | 12/2008 | Wen et al. | ........................ | 386/46 |
| 2008/0304718 A1* | 12/2008 | Ryuto et al. | .................. | 382/118 |
| 2011/0013810 A1* | 1/2011 | Engstrom et al. | ............. | 382/118 |

OTHER PUBLICATIONS

Zhang et al., "Automated Annotation of Human Faces in Family Albums," MM'03, Nov. 2-8, 2003, Berkeley, California, USA.
Anguelov et al., "Contextual Identity Recognition in Personal Photo Albums," Proceeding of the Conference on Computer Vision and Pattern Recognition (CVPR), 2007.

* cited by examiner

*Primary Examiner* — Atiba O Fitzpatrick
*Assistant Examiner* — Jhere Rowland
(74) *Attorney, Agent, or Firm* — Kilpatrick Townsend & Stockton LLP

(57) ABSTRACT

Face detection is performed on a plurality of images to identify a plurality of faces. A subset of the plurality of faces is activated, including by loading into memory the subset of faces and/or data corresponding to the subset of faces. At least one of the plurality of faces is left un-activated. A distance for each pair of activated faces is calculated, wherein the distance is associated with a measure of a similarity between a first face and a second face. The activated faces are clustered into a plurality of groups based at least in part on the distances. A representative face is selected from each group resulting from the clustering and the representative faces are displayed.

18 Claims, 10 Drawing Sheets

400

You labeled these face(s) as Bob:

402

Are these faces also Bob?

☒ Yes                ☒ Yes

☐ No, it's [    ]    ☐ No, it's [    ]

404

You labeled these face(s) as Jane:

406

Are these faces also Jane?

☐ Yes

☒ No, it's  Sarah

408

Compact Cache

| Face | Image | Certainty | Timestamp | Label |
|---|---|---|---|---|
| 1 | A | $C_1$ | $TS_1$ | Bob |
| 2 | B | $C_2$ | $TS_2$ | Bob |
| 3 | B | $C_3$ | $TS_3$ | Jane |
| 4 | C | $C_4$ | $TS_4$ | Bob |
| 5 | C | $C_5$ | $TS_5$ | Sarah |
| 6 | D | $C_6$ | $TS_6$ | -- |
| 7 | D | $C_7$ | $TS_7$ | -- |
| 8 | D | $C_8$ | $TS_8$ | -- |

EFFICIENT AND SCALABLE FACE RECOGNITION IN PHOTO ALBUMS

BACKGROUND

Labeling faces in an image (also referred to as tagging a face) is a time-consuming task that many people are not interested in doing. For example, it may take hours to manually label some collections of photographs with people's names. To reduce the amount of time spent labeling faces in a collection of images, (semi) automated face tagging systems have been developed where a user tags some of the faces and the system suggests or in general assigns tags based on the user-assigned tags and face matching or recognition technology. In some cases, a collection of photographs is relatively large (e.g., thousands of images or more) and some of these (semi) automated face tagging systems slow down when operating on large collections of photographs. It would be desirable to develop systems that are scalable and do not significantly slow down when processing large collections of images.

BRIEF DESCRIPTION OF THE DRAWINGS

Various embodiments are disclosed in the following detailed description and the accompanying drawings.

DETAILED DESCRIPTION

The techniques disclosed can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
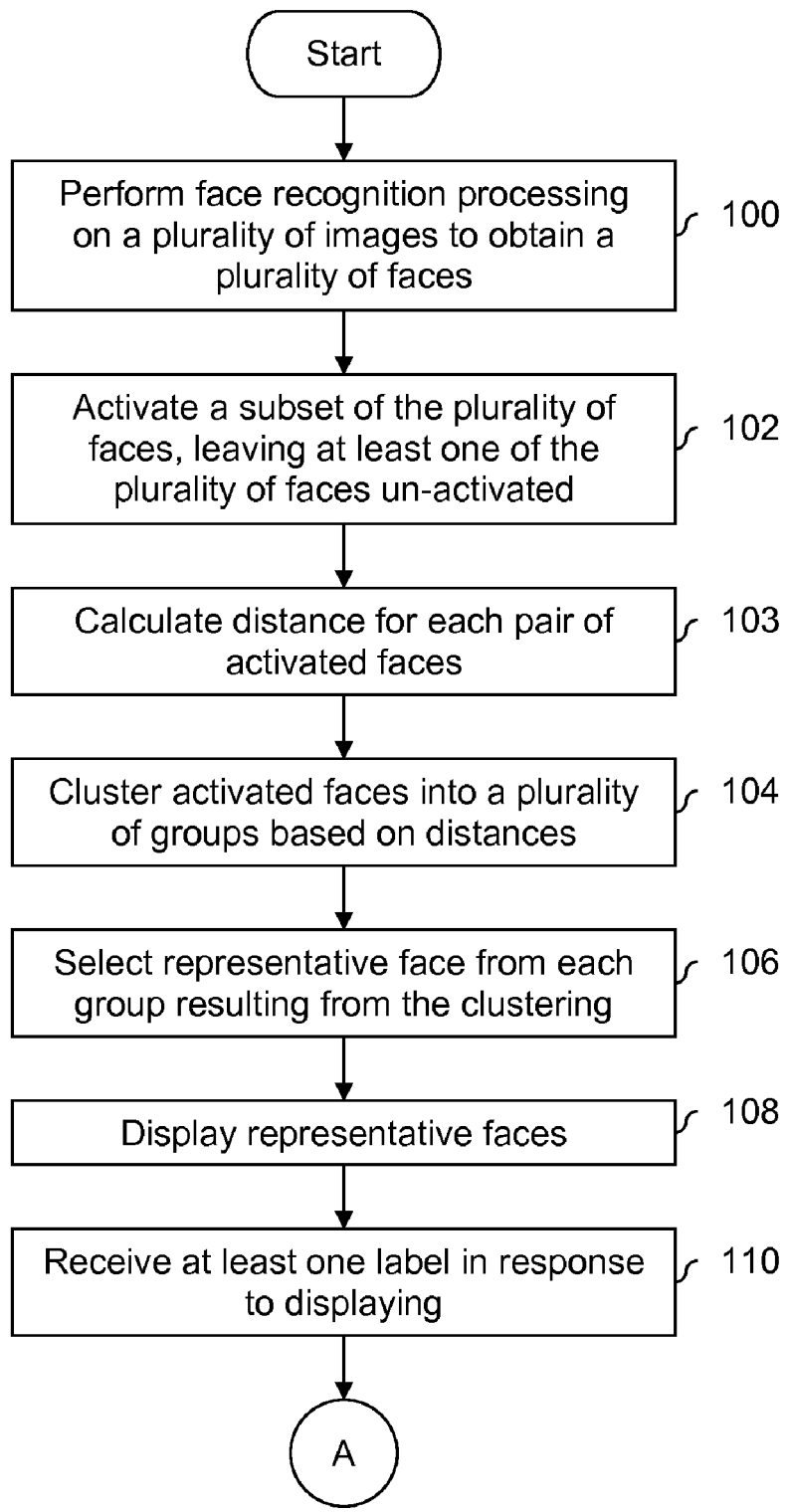
FIG. 1 is a flowchart illustrating an embodiment of a process for displaying faces to a user for labeling.

FIG. 1 is a flowchart illustrating an embodiment of a process for displaying faces to a user for labeling. In the example shown, none of the faces in the images have a label assigned to them. As used herein, a face is a given face in a given image. Some examples of labels include people's names; labels are sometimes referred to as tags. In various embodiments, an image is a Joint Photographic Experts Group (JPEG) file, Graphics Interchange Format (GIF) file, Tagged Image File Format (TIFF) file, or Portable Network Graphics (PNG) file. In some embodiments, the process is part of a software application (e.g., running locally on a user's device) associated with accessing and/or managing images and/or images, such as Adobe® Photoshop® Elements, Adobe® Photoshop® Lightroom®, Adobe® Photoshop®, or Adobe® Premiere® Elements.

At 100, face detection processing is performed on a plurality of images to obtain a plurality of faces. For example, face recognition processing may identify regions or portions of an image that correspond to a face. In various embodiments, a variety of techniques or face recognition applications may be used. Some examples include Cognitec's FaceVACS®, Eigenfaces, Adaboost, and neural networks. Face detection is associated with finding the faces in images and face recognition is associated with identifying who (e.g., the specific person) the face belongs to. At step 100, face detection is used.

A subset of the plurality of faces is activated, leaving at least one of the plurality of faces un-activated at 102. As used herein, an activated face is a face which (or one for which corresponding data) is loaded into memory (e.g., for processing). The set of active individuals changes over time so that faces which are not activated during a first or initial round of processing are later activated and processed. In some embodiments, a maximum number of faces (M) is selected at 102. In some embodiments, M varies or is otherwise selected based on a variety of factors. Some examples includes amount of memory available on a user's (local) device and total number of faces to be processed.

In some embodiments, one or more rules are used to determine which faces to activate at step 102. Some example rules for activating and/or keeping a face active are:

If a face is labeled, keep at least one face associated with that face active. By keeping a face active, labels can be suggested for similar looking faces. In some embodiments, information associated with faces having the same label can be collapsed, merged, or otherwise reduced in order to the reduce the number of active faces.

If at least one face in an image is active, all other (unlabeled) faces in that image are good candidates for activating. For example, using the process of elimination, if one face in the image is Bob, then the other faces in the image are probably not Bob. If the other faces are not active when the Bob face is activated, this information might not be considered. In some embodiments, a labeled face may be de-activated if at least face (e.g., composite or selected) remains active for that label. For example, to continue the above example, there may be a Bob face active, but it may not necessarily be the one from that image.

If a face is active, activate other faces having a similar or nearby timestamp information. A timestamp refers in general to the time and/or date at which the image was captured and some examples of this rule include activating all faces from images taken on the same date, within an hour of each other, etc. Some distance calculations are based on clothes and using time and/or date information to activate a face may help ensure that faces with the same clothes (if any) are active at the same time (e.g., people are more likely to be wearing the same clothes on the same day or within the span of an hour).

If an image is selected by a user (e.g., using a mouse or other stylus), activate the faces in the image. For example, the user may be interacting with his/her collection of images via an application for accessing or managing images (e.g., Adobe Photoshop Elements) and may have one or more images selected.

Activate faces that have more information and/or better quality information before ones with less/lower quality information. For example, some face recognition and/or distance calculation processes output a certainty. In one example of this type of rule, faces that were detected with a higher certainty are selected over ones with a lower certainty. It may be difficult for a face recognition process to detect a face in a blurry image or in a relatively "zoomed-out" image with strong certainty, and it would not be useful to present to a user and/or have a system operate on a face that might be some other type of object (e.g., a mannequin).

It is not necessary for face recognition processing at 100 to have completed for all images in a collection; in some embodiments, step 102 starts before processing at 100 is completed for all images. In some embodiments, activation of a subset of faces at step 102 begins after a certain percentage or number of images have completed face recognition processing, or after a certain number of faces have been detected. In some embodiments, face recognition processing is performed in the background. For example, a background process may be constantly running that detects images (e.g., in a My Pictures folder or other likely location for images to be kept) and performs face recognition processing without being instructed to do so by a user.

At 103, a distance is calculated for each pair of activated faces. A distance as used herein is a measure of the similarity (or dissimilarity) between two faces and a variety of techniques can be used to calculate a distance. A larger distance corresponds to a greater dissimilarity between two faces. Distance can also be interpreted as likelihood that the two faces belong to the same individual—if the distance between two faces is small, they are more likely to be faces of the same person. In some embodiments, heuristics, records, or other metadata generated by a face recognition process performed at 100 is used in determining a distance. In this particular example, none of the faces have been labeled. In some embodiments, the distance between two labeled faces with different labels is set to a maximum or infinite distance. In some embodiments, $d_{i,j}=d_{j,i}$, i.e. the distance function is symmetric.

At 104, the activated faces are clustered into a plurality of groups based on the distances. In some embodiments, agglomerative clustering is performed where every face begins in a separate cluster. Then the most similar pairs of clusters are identified and merged. In some embodiments this process is repeated until the distance between the most similar pair of clusters exceeds a threshold T. Alternatively, in some embodiments the merging process is repeated until a fixed number of clusters is obtained. A distance between two clusters may be defined as a distance between the closest faces within these two clusters, also called simple linkage. Two other common methods is to define the distance between two clusters as the distance between the average face in each cluster, or the maximum distance between any two faces in the clusters. A simple version of this clustering runs in $O(N^3)$, but in some cases it is possible to do in $O(N^2 \log N)$ or better.

A representative face is selected from each group resulting from the clustering at 106. For example, if there are three groups resulting from the clustering, at least one face from each of the three groups is selected to be the representative face for that group. In some embodiments the centroid element of a cluster is selected as its representative face. In this example, none of the faces are labeled yet, and in some embodiments a representative face is selected only for groups for which none of the faces are labeled. Faces in the system are either unlabeled or labeled. A labeled face is one that has a label assigned or otherwise applied to it. In some embodiments, a system is permitted to label a face if the system is sufficiently certain the label is proper for the face (e.g., the distance between an unlabeled face and one that has been labeled by a user is less than a threshold) and such a face with a label assigned by the system is considered to be a labeled face. In some embodiments, a representative face is selected based on pair-wise distances between faces. One example of this is described in further detail below.

With respect to selecting a representative face at 106, faces within the same cluster likely belong to the same individual, whereas faces from different clusters likely do not. A good way to gain information about the label of each face is to ask the user to label a face from each cluster. It can then be guessed that the other faces in that cluster have the same label.

In some embodiments, selecting a representative face is based at least in part on a certainty or quality value associated with a face. For example, a face detection process may output a value representing how certain the process is that the identified face is actually a face (and is not, for example, some other type of object). It would be undesirable to present to a user an object that is not actually a face. In some embodiments, a quality value representing the image quality (e.g., clear versus blurry, (over) exposure, forward facing versus a profile, poor/good contrast, etc.) is used in selecting a face to be the representative face. In some embodiments, a certainty or quality value is used as a tie-breaker between two candidate faces (e.g., if there are only two faces in a group or if there is an even number of faces in a group and two faces are equally close to a centriod).

Representative faces are displayed at 108. In some embodiments, a question or prompt is presented with the representative faces, such as "Please label these faces." At least one label is received in response to displaying at 110. For example, the labels "Bob" or "Jane" may be received in response to displaying the representative faces.

In some embodiments, one or more rules are used to perform or otherwise govern clustering (e.g., at 104). Some example rules which are used in various embodiments are:

There is at most one person associated with a given label. Put another way, two people cannot have the same label. For example, if there are two people named Bob who are depicted in a collection of photographs, then unique labels must be used for them (e.g., "Bob A." and "Bob B."); they both cannot have the label "Bob."

A given label is associated with at most one group or cluster. For example, there cannot be two groups each of which includes at least one face labeled "Bob." Merging or re-clustering may be performed to satisfy this rule.

Clustering is performed so that a given group contains faces which are labeled with at most one label. For example, two faces from the same group cannot have different labels. As above, dividing or re-clustering may be performed in order to satisfy this rule.

In some embodiments, there is a "don't label this face" label. In one example, a collection of images includes a large number of faces of strangers the user doesn't want to label. The user labels some or all of those faces with the "don't label this face" label and in some embodiments the system learns to identify faces that are probably faces of strangers and asks the user "are all these faces of strangers?" In some embodiments, the system knows the faces labeled with the "don't label this face" have not been identified as being the face of a specific person (e.g., so will not include it a folder containing faces of a given person). In some embodiments, a "don't label this face" label enables a user to stop being asked by the system to label that face.

Some other systems that attempt to keep all faces (and/or related information associated with all faces) active in memory in order to process all faces at once do not scale well. For example, if all identity records are available in memory, all faces are processed simultaneously, and agglomerative clustering is done naively, the processing is $O(N^3)$, where N is the number of faces. In contrast, a system that processes a subset of the images at a time (e.g., as described herein) scales better.

Figure 2:
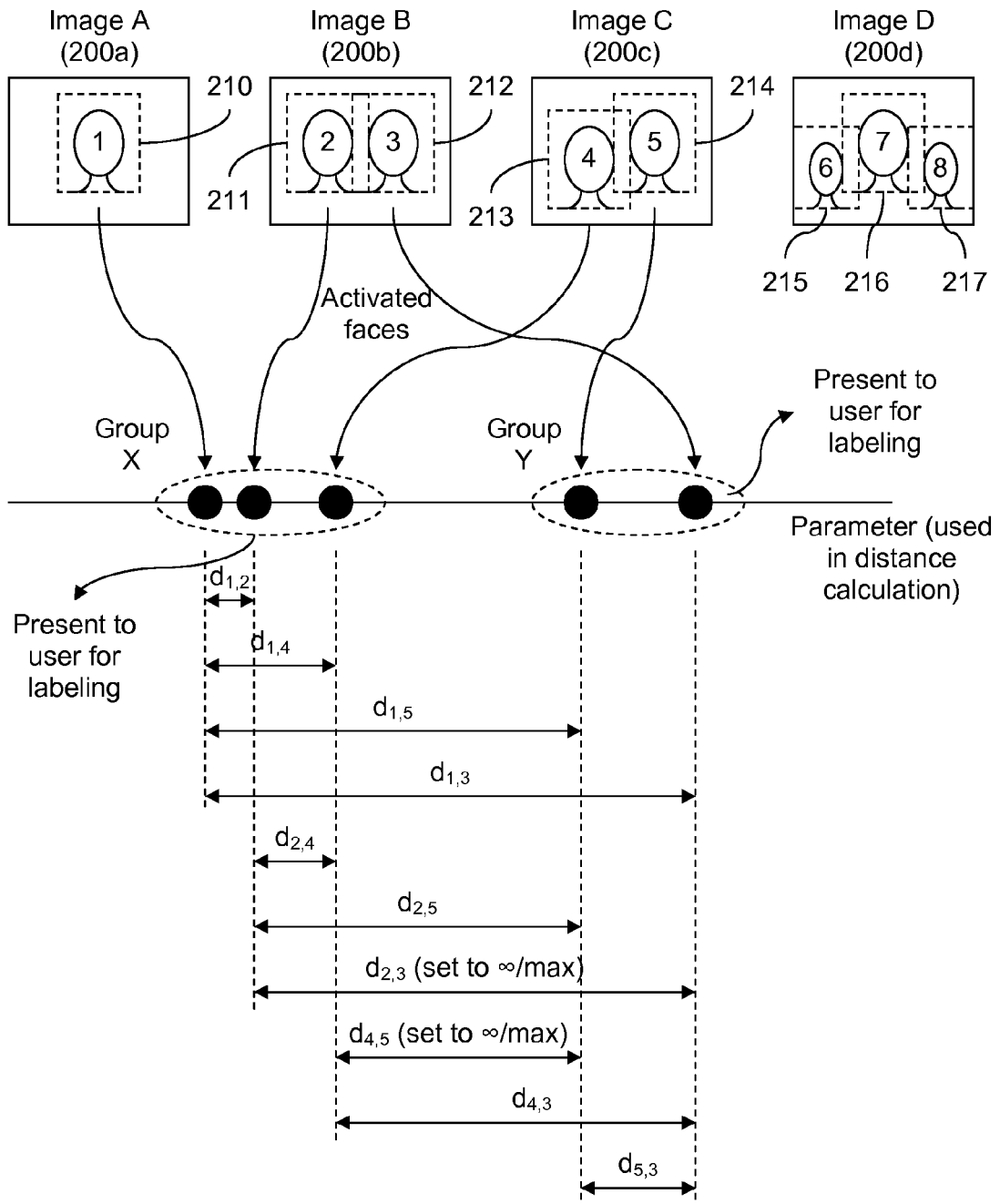
FIG. 2 is a diagram showing an embodiment of images with faces where a subset of the faces are selected for processing and presented to a user for labeling.

FIG. 2 is a diagram showing an embodiment of images with faces where a subset of the faces are selected for processing and presented to a user for labeling. In the example shown, images A-D (200a-200d) are processed according to the example process shown in FIG. 1.

Face detection is performed on images A-D (200a-200d), resulting in faces 1-8 (210-217). Faces 1-5 (210-214) are activated and faces 6-8 (215-217) are un-activated in this example. In this example, if one face is activated from an image, all faces from that image are also activated. Active faces 1-5 (210-214) are clustered into two groups: group X consisting of faces 1, 2, and 4 (210, 211, and 213) and group Y consisting of faces 3 and 5 (212 and 214). In this example, the faces are clustered into groups based on distance. For clarity and to illustrate the techniques described herein, a single parameter or heuristic is used in this example to calculate the distance and the faces are represented as dots along a single axis. In some other embodiments, two or more parameters or heuristics are used to calculate a distance (corresponding to 2-D space, 3-D space, etc.).

In this example, a face is clustered into a group if the distance between it and the closest member of the group is less than a threshold. For example, if face 4 (213) is being processed, if the distance between it and its closest neighbor in group X (i.e., face 2 (211)) is less than a threshold then the face is added to the group. That is, if $d_{2,4}$<threshold.

In some embodiments, the distance between two faces in the same image are set to infinity or a maximum value. For example, the distance between faces 2 and 3 (i.e., $d_{2,3}$) and between faces 4 and 5 (i.e., $d_{4,5}$) are set to infinity or a maximum distance value in such embodiments. In some applications this is desirable because an infinite or maximum value prevents two faces in the same image from being clustered together in the same group. It is unlikely, for example, that two faces in the same image are in actuality the same person; it is more likely that they are two different people. Is therefore often better for two faces from the same image to be in different groups by setting the distance to an infinite or maximum value.

Once clustering is performed, representative images are selected from each group. For group X, face 2 (211) is selected to be the representative face. Graphically, this corresponds to selecting the cetroid element of the cluster. For group Y, either face 3 or face 5 can be the representative face. In some embodiments, using a quality and/or certainty value as described above is used to select a representative face for group Y since there are only two faces in that group. To continue the example, suppose face 3 (212) is selected as the representative face.

The representative faces (i.e., face 2 (211) and face 3 (212)) are then presented to a user for labeling (not shown). In some embodiments, more than one representative face is selected and presented from a given group.

Figure 3:
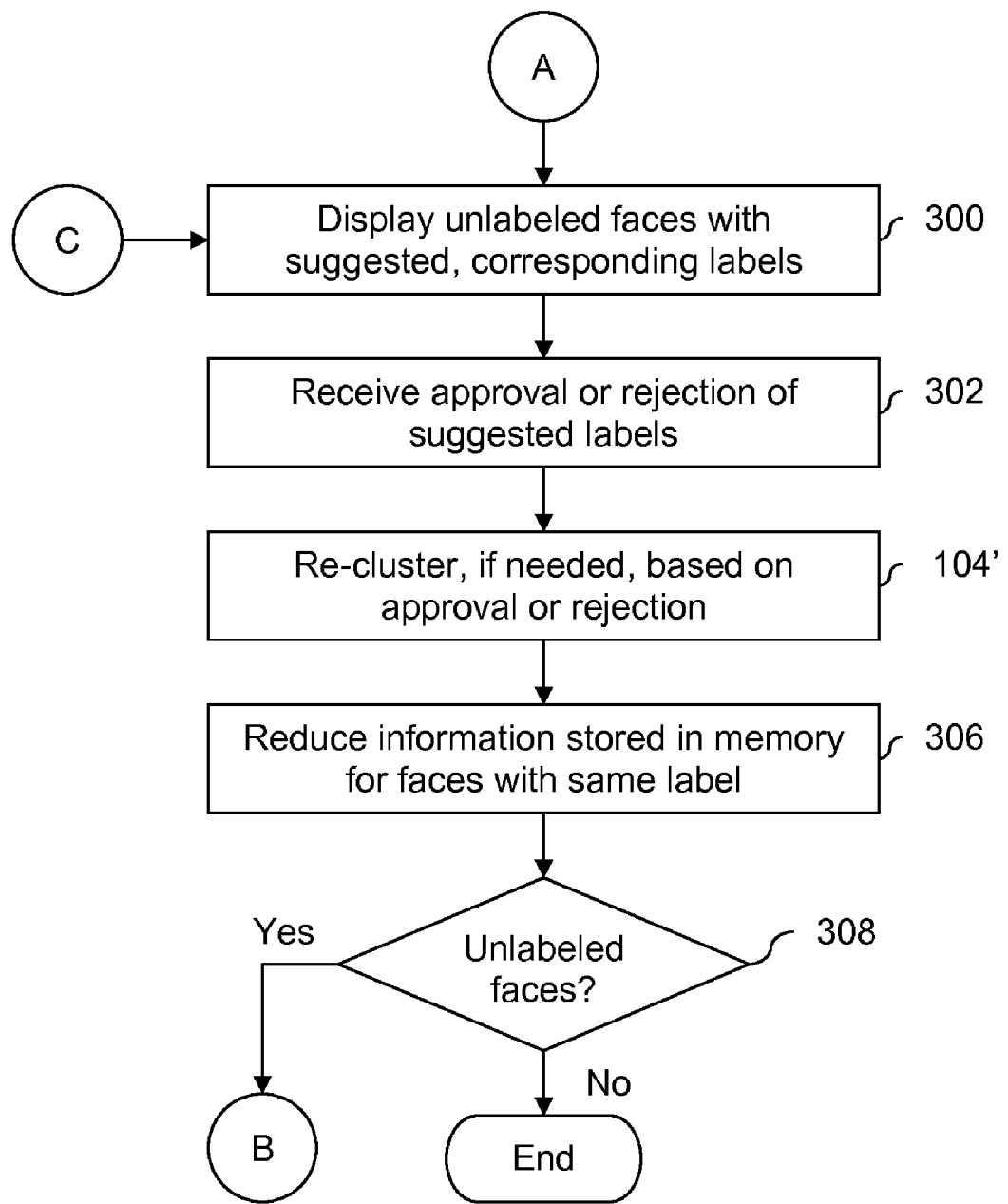
FIG. 3 is a flowchart illustrating an embodiment of processing performed in response to receiving a label from a user.

FIG. 3 is a flowchart illustrating an embodiment of processing performed in response to receiving a label from a user. In some embodiments, the example process is performed after the process shown in FIG. 1. Alternatively, in some embodiments, one or more steps from FIG. 1 are interleaved with one or more steps from FIG. 3.

At 300, unlabeled faces are displayed with suggested, corresponding labels. For example, a label received for a representative image in a cluster is used as the suggested label for the remaining, unlabeled faces in that cluster. In some embodiments, a label assigned by a user and the previously presented face which was labeled are displayed at 300. For example, a display may say, "You labeled this face <label>."

Approval or rejection of the suggested labels is received at 302. For example, a graphical user interface (GUI) may include interactive controls (such as check boxes, pull-down menus, etc.) via which a user can either approve or reject a suggested label. In some embodiments, a user is able to provide a correct label if a suggested label is rejected.

Re-clustering, if needed, is performed based on the approval or rejection at 104'. In some embodiments, the same process or module that performs clustering at 104 in FIG. 1 performs re-clustering here. In some embodiments, distance information is updated prior to re-clustering. For example, the distance between two faces where the user has assigned or confirmed different labels is set to infinity or a maximum distance. Then, using the updated distance information, re-clustering is performed. In some embodiments, one or more clustering rules (some examples of which are described above) are used during re-clustering. For example, one rule is to have at most one label associated with a group of faces. That is, a face with the label "Bob" cannot be in the same group as a face with the label "Jane."

At 306, information stored in memory is reduced for faces with the same label. In some embodiments, this includes collapsing identifiers, heuristics, or distances into a smaller number of identifiers, heuristics, or distances. In various embodiments, a composite is generated by combining information from multiple faces, or a representative set of information is selected to remain active and the rest of the information is de-activated. Some example of the information reduced at 306 includes metadata or identification records generated by a face recognition process. For example, FIR is Cognitec's Face Identification Record, and CIR is a clothes identification record. In some embodiments, information is not necessarily reduced to a single data element or object at 306. For example, if there are 10 faces with corresponding data, 2 faces (and/or information corresponding to those faces) are selected to remain active and the rest are de-activated.

At 308, it is determined if there are unlabeled faces. For example, referring to the state shown in FIG. 2, faces 6-8 (215-217) have not been processed (and are thus unlabeled) and the determination at 308 would determine there are unlabeled faces. If there are no unlabeled faces, the process ends. In some embodiments, labels are stored in (e.g., non-volatile) storage such as a disk storage system and can be retrieved later (e.g, by an application for accessing and/or managing images such as Adobe Photoshop Editor).

Figure 4:
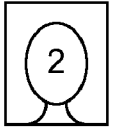
FIG. 4 is a diagram showing an embodiment of a graphical user interface for presenting faces to a user with suggested labels.
Figure 4:
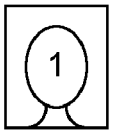
Figure 4:
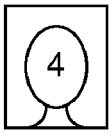
Figure 4:
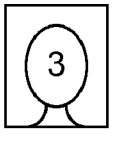
Figure 4:
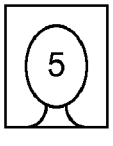

FIG. 4 is a diagram showing an embodiment of a graphical user interface for presenting faces to a user with suggested labels. In the example shown, the example of FIG. 2 is continued and labels have been assigned by a user to faces 2 (211) and 3 (212). GUI 400 shows an example of steps 300 and 302 from FIG. 3. The faces and clustering shown in GUI 400 are a continuation of the example faces and clustering shown in FIG. 2. The assignment by a user of the label "Bob" to face 2 and the label "Jane" to face 3 is not shown. In some embodiments, some other arrangement or combination of elements, descriptions, queries, or interactive controls is used.

GUI 400 includes four regions. Regions 402 and 406 show the representative faces that were previously displayed and the labels assigned by the user to those faces. For example, region 402 includes the description "You labeled these face(s) as Bob:" with face 2 and region 406 includes the description "You labeled these face(s) as Jane:" with face 3. Regions 404 and 408 show unlabeled faces with suggested labels. Faces 1 and 4 which are displayed in region 404 with a suggested label of "Bob" are in the same group (i.e., group X) as face 2 (see FIG. 2). Region 404 includes the question "Are these faces also Bob?" and below each face in region 404 are yes/no check boxes, and next to the no check boxes are boxes for entering an alphanumeric value if the no check box is selected. Similarly, region 408 includes the question "Are these faces also Jane?", face 5, yes/no check boxes, and a box for entering a label for face 5 if the no check box is selected.

In this example, the user has selected the yes check boxes for faces 1 and 4 in region 404 in response to the question "Are these faces also Bob?". In response to the question "Are these faces also Jane?" in region 408, the user has selected the no check box and entered a label of "Sarah" for face 5.

Figure 5:
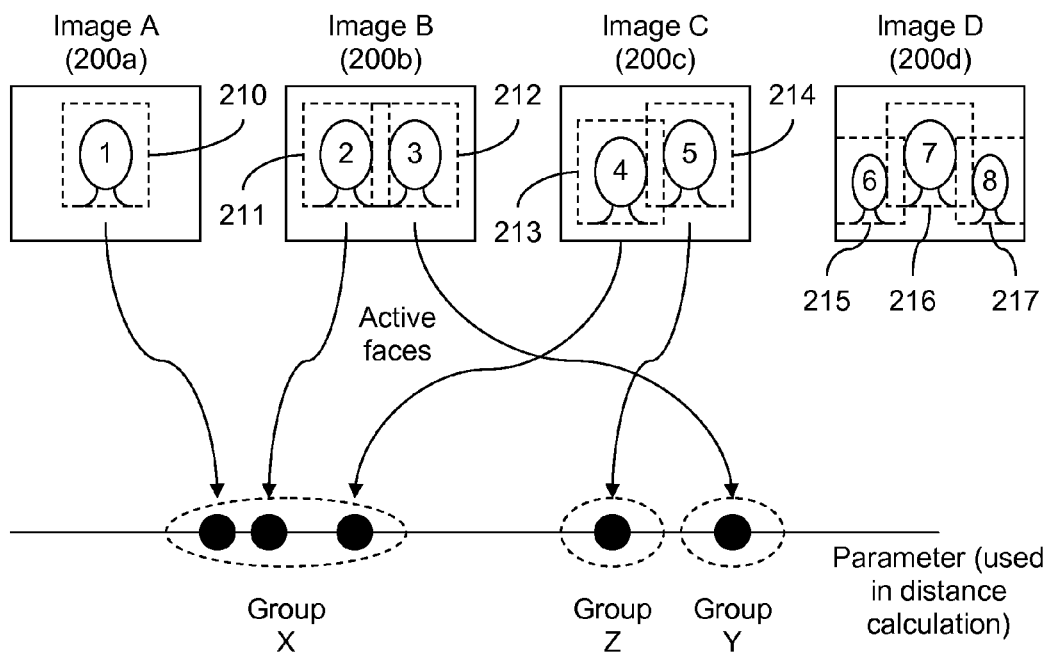
FIG. 5 is a diagram showing an embodiment of re-clustering performed in response to a rejection of a suggested label.

FIG. 5 is a diagram showing an embodiment of re-clustering performed in response to a rejection of a suggested label. In the example shown, FIG. 5 follows the example of FIG. 4 where the user rejected the suggested label of "Jane" for face 5 and instead assigned a label of "Sarah."

Re-clustering is performed so that the group X which previously included faces 3 and 5 (212 and 214) now includes face 3 (212) and new group Z is created which includes face 5 (214). In some embodiments, $d_{3,5}$ is set to infinity or a maximum value.

Figure 6:
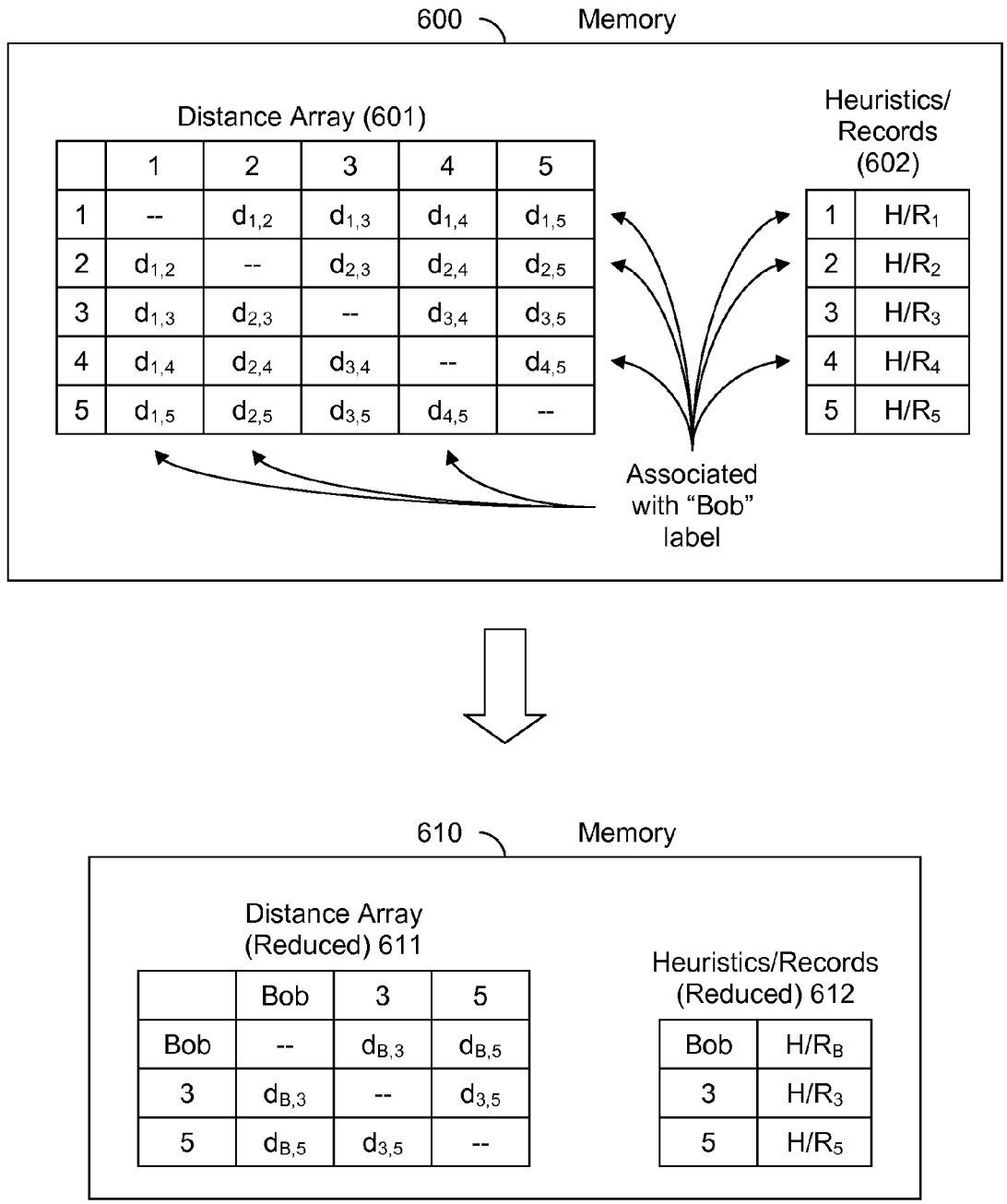
FIG. 6 is a diagram showing an embodiment of information in memory which is reduced.

FIG. 6 is a diagram showing an embodiment of information in memory which is reduced. In some embodiments, reducing information at step 306 in FIG. 3 is performed as shown.

Memory 600 shows information in memory prior to a reduction. In the example shown, memory 600 includes distance array 601 and heuristics/records 602. Distance array 601 is a 5×5 array that stores the respective distances between pairs of faces that are active. In this example, faces 1-5 are active and therefore distance array 601 is a 5×5 array. Information stored in distance array 601 may be updated as appropriate. For example, if the distance between two faces is set to infinity or a maximum value (e.g., because they are from the same image or because they are associated with different labels) the corresponding distances in array 601 are updated.

Heuristics/records 602 are used in generating distances and in some embodiments are generated by a face recognition process. In this example, distances are only calculated for faces that are active. In some embodiments, to calculate the distances, heuristics/records 602 are first loaded into memory 600. Then, using the loaded heuristics/records 602, the distances are calculated and array 601 is populated. Some example heuristics/records used to determine distance include clothes, skin tone, position/placement of key features in a face (e.g., eyes, nose, mouth, etc.), the shape of an ear, etc.

Distance array 601 and heuristics 602 are examples to illustrate the techniques and an actual data structure may vary from that shown. For example, distance array 601 is symmetrical along the diagonal so it may not be necessary to maintain the entire 5×5 array shown. In some other embodiments, some other type of information is stored in memory.

In this example, faces 1, 2, and 4 are associated with the "Bob" label and the rows and columns associated with that label are reduced.

Memory 610 shows memory 600 after the distance array and heuristics/records have been reduced. Distance array 611 includes a row and column for "Bob" and heuristics/records 612 includes a row for Bob. In some embodiments, information is reduced by selecting information to retain and discarding un-selected information. For example, face 2 could be selected to be retained and $d_{B,3}=d_{2,3}$, $d_{B,5}=d_{2,5}$, and $H/R_B=H/R_2$. In some other embodiments, composite information is generated (e.g., based on two or more faces) and the composite information is retained. For example $d_{B,3}=f(d_{1,3}, d_{2,3}, d_{3,4})$, $d_{B,5}=f(d_{1,5}, d_{2,5}, d_{4,5})$, and $H/R_B=f(H/R_1, H/R_2, H/R_4)$.

Figure 7:
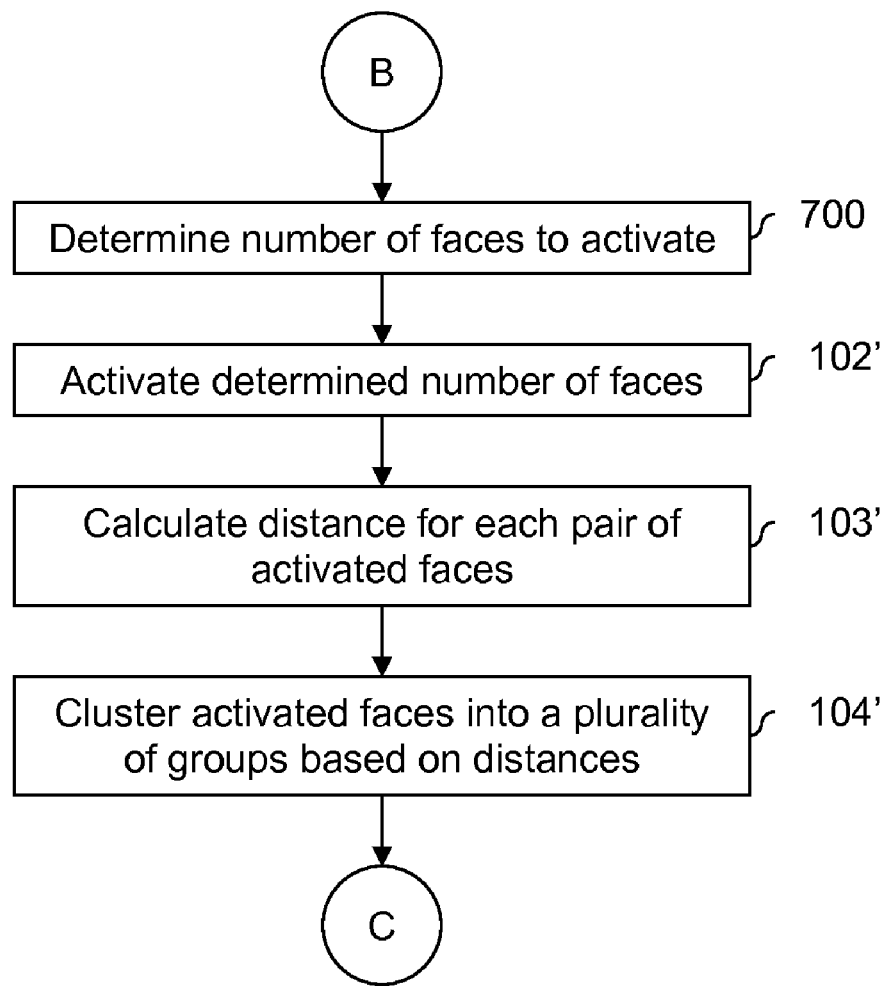
FIG. 7 is a flowchart illustrating an embodiment of a process for activating faces after information in memory has been reduced.

FIG. 7 is a flowchart illustrating an embodiment of a process for activating faces after information in memory has been reduced. In the example shown, the process shown in FIG. 7 follows that shown in FIG. 3. Some of the steps shown in FIG. 7 are the same or are similar to steps shown in FIG. 1 and correspondence is indicated by reference number.

At 700, a number of faces to activate are determined. In some embodiments, the determination at 700 is based on the number of faces and/or amount of information that was reduced at step 306 in FIG. 3. For example, in the example of FIG. 6, if M (the maximum number of active faces) is 6 then three new faces may be activated since three faces are active in memory 610 and three additional faces will not exceed M=6.

At 102', the determined number of faces is activated. At 103', a distance is calculated for each pair of activated faces. For example, heuristics/records for each (newly) activated face may be loaded into memory and the heuristics/records are used to calculate distances and the calculated distances are stored in a distance array.

Activated faces are clustered into a plurality of groups based on the distances at 104'. Whereas the clustering at 104 in FIG. 1 had no labels assigned or verified by a user, clustering here has some faces that have been labeled and some that are not labeled (e.g., because they were recently activated at 102'). In some embodiments, clustering that existed before additional faces are activated at 102' is used as a starting point during clustering at 104'. For example, each newly activated face is added to an existing cluster or group if appropriate.

Figure 8:
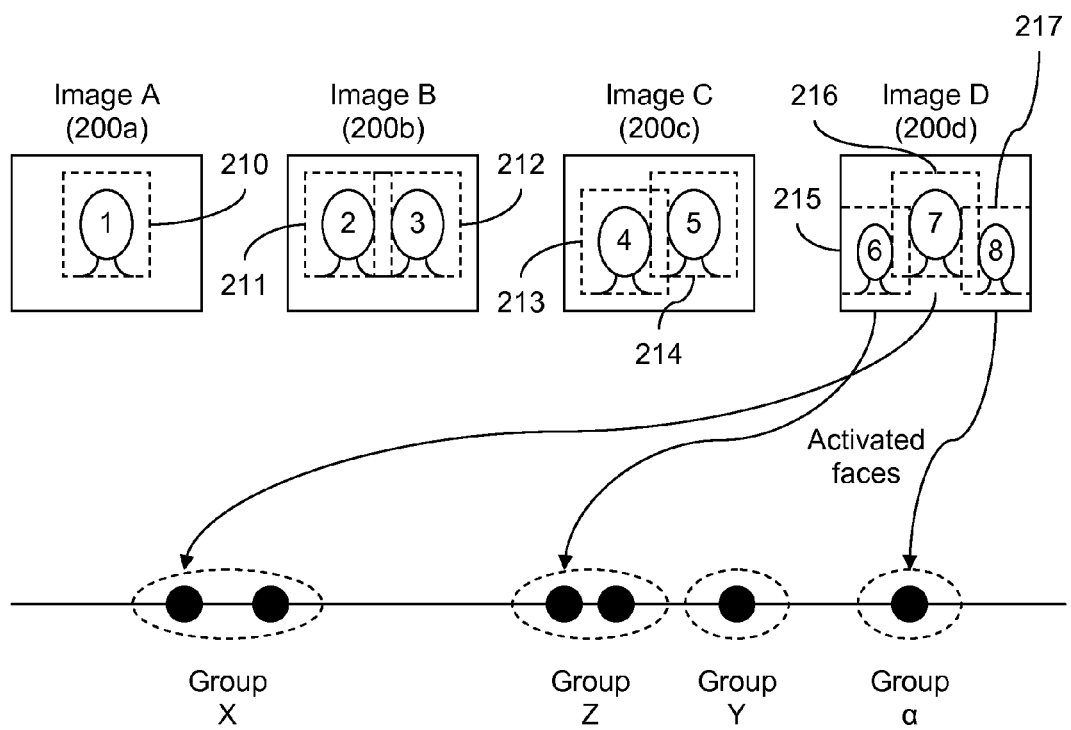
FIG. 8 is a diagram showing an embodiment of faces in image that are activated after information in memory is reduced.

FIG. 8 is a diagram showing an embodiment of faces in image that are activated after information in memory is reduced. In the example shown, faces 6-8 (215-217) are activated. After determining pair-wise distances, face 7 is clustered into group X, face 6 is clustered into group Z, and face 8 is clustered into new group, α. Not that groups that existed before faces 6-8 were activated (i.e., groups X-Z) still exist and newly active faces 6-8 are added to those groups if appropriate.

In some embodiments, for faces that are groups which have at least one face that is labeled, the unlabeled faces are displayed to a user with a suggested label. Some examples are described in FIG. 4 and step 300 in FIG. 3. For example, this may be how faces 6-7 in this example are processed. In some embodiments, for faces that are in groups for which none of the faces have a label, a representative face is selected and displayed to a user for labeling, for example as described in steps 106 and 108 in FIG. 1. In some embodiments, face 8 in group α is handled in this manner.

Figure 9:
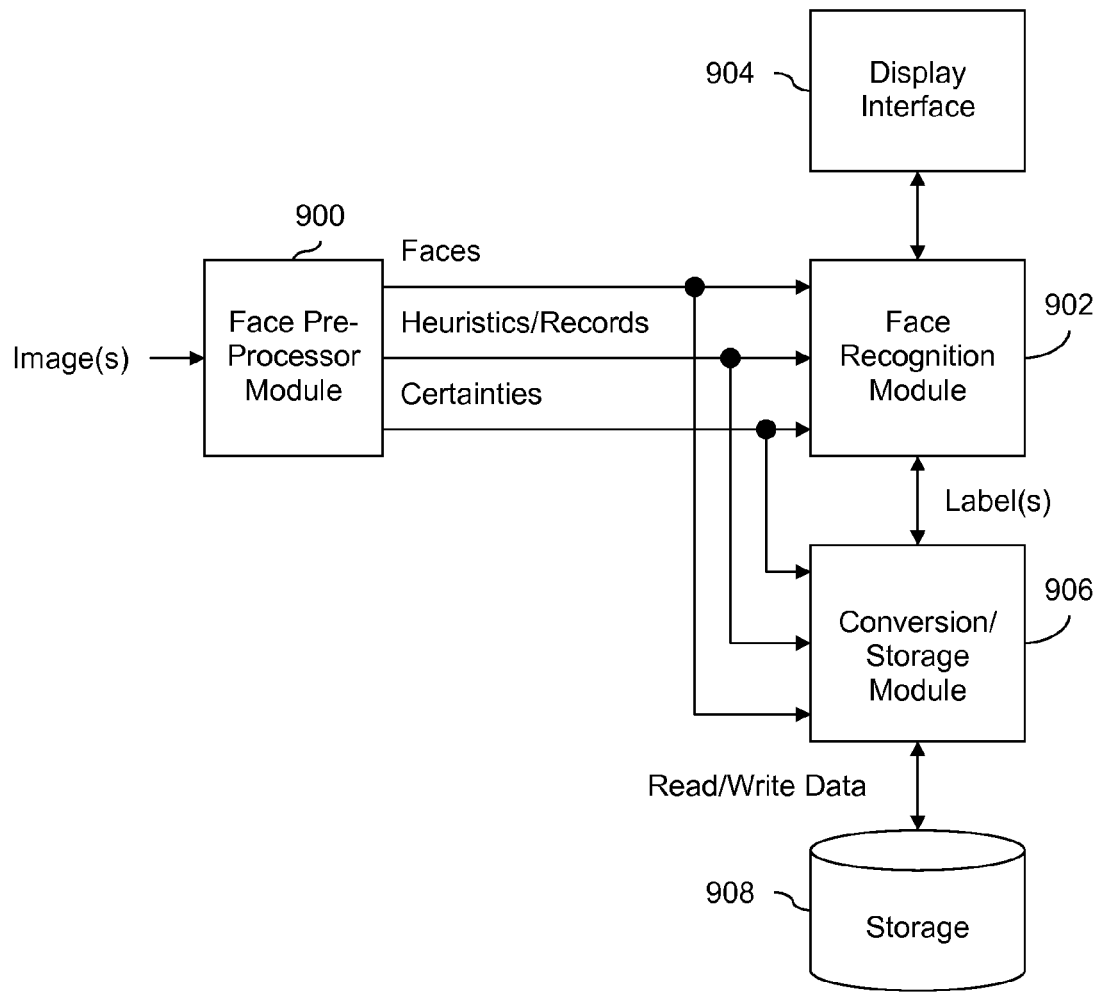
FIG. 9 is diagram showing an embodiment of a system configured to process a subset of faces at a time.

FIG. 9 is diagram showing an embodiment of a system configured to process a subset of faces at a time. In the example shown, the system includes face pre-processor module 900 which receives images, performs face detection and outputs faces, heuristics/records, and certainties which are passed to face recognition module 902 and face conversion/storage module 906. In the example shown, face pre-processor module 900 takes images or selected video frames, analyzes them, and generates metadata (e.g., heuristics/records) and faces which are used by face recognition module 902 to calculate a distance between two faces. This metadata can be generated without the user's involvement and is sometimes referred to as identification records. In some embodiments, face pre-processor module 900 is used during step 100 in FIG. 1.

Face recognition module 902 uses the heuristics/records to perform user-assisted labeling; a more detailed example of face recognition module 902 is described in further detail below. Face recognition module 902 is coupled to display interface 904 via which suggested labels are presented to a user and via which acceptance/rejection of suggested labels and/or assignment of labels by a user are received. For example, FIG. 4 shows one example of a display presented to a user via display interface 904.

Conversion/storage module 906 is coupled to storage 908 and is used to perform conversion between application-specific metadata and other formats (such as XML format) and store (converted) data. In some embodiments, versioning is supported. In this example, conversion/storage module 906 stores the faces, heuristics/records, and certainties that are generated by face pre-processor module 900. In some cases, labeling may not be completed in a single sitting and saving information reduces the amount of work that must be repeated later. Conversion/storage module 906 also receives labels from face recognition module 902 and stores the received labels in storage 908. In some embodiments, a label is only stored in storage 908 if a user has assigned that label or has accepted a suggested label.

Figure 10:
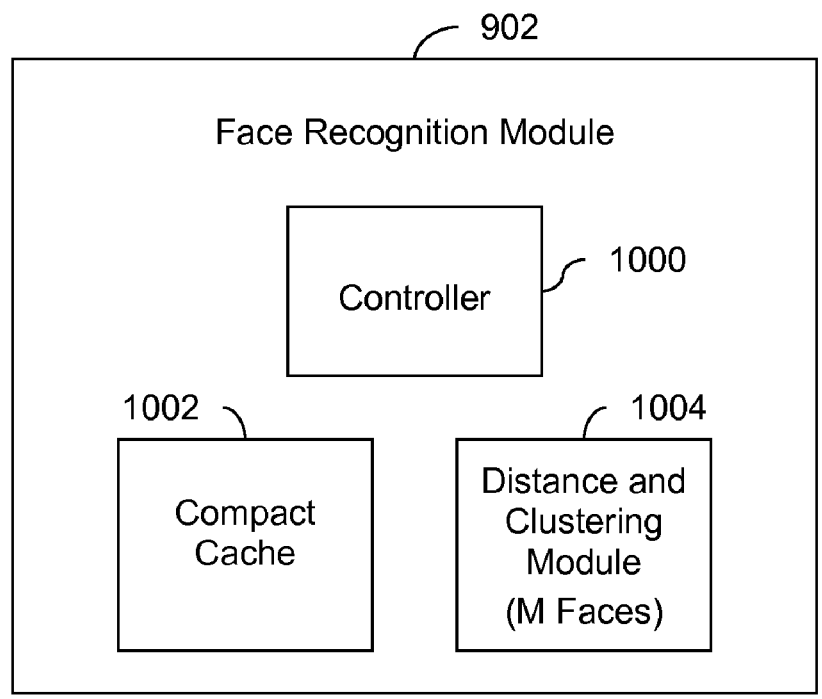
FIG. 10 is a diagram showing an embodiment of a face recognition module and a compact cache.

FIG. 10 is a diagram showing an embodiment of a face recognition module and a compact cache. In some embodiments, face recognition module 902 from FIG. 9 is implemented as shown. Face recognition module 902 is configured to process a subset of faces at a time (e.g., as opposed to all faces at once). Performance of face recognition module 902 scales better for large collections of images compared to other systems that process all faces or images at once.

Face recognition module 902 includes controller 1000, compact cache 1002, and distance and clustering module 1004. In this example, at most M faces are active at a time and distance and clustering module 1004 calculates distances for and clusters at most M faces at a time. Distance and clustering module 1004 may not necessarily be aware of non-active faces. Controller 1000 uses information stored in compact cache 1002 to determine what faces to activate (and/or which faces to de-activate) when distance and clustering module 1004 has finished processing and it is time to change the set of faces being processed.

In the example shown here, compact cache 1002 includes columns for the face, image, certainty, timestamp, and label (if any) and is not limited to M faces. This information is used by controller 1000 to determine what faces to activate next. For example, some activation rules attempt to activate faces from the same image together and which image a face is included in (stored in the Image column) is used by controller 1000 to determine what faces to activate together. In another example, faces having the same or similar timestamp are activated together and the information in the Timestamp column is used to decide what faces to activate together.

In some embodiments, compact cache 1002 is updated over time as face-preprocessor module 900 (from FIG. 9) processes images. Put another way, controller 1000 and distance and clustering module 1004 do not necessarily wait for face pre-processor module 900 to finish processing all images in a collection before starting. For example, suppose a collection of photographs has 1,000 photographs in it. As each photograph is processed, the information generated by face pre-processor module 900 in FIG. 9 is passed to face recognition module 902 and is added to compact cache 1002 (e.g., by adding a new row and column for each face that is received). In one example, after 50 faces have been received, 10 or fewer faces (i.e., M=10) are selected by controller 1002 to be activated and distance and clustering module 1004 is instructed to calculated the distances and cluster those activated faces. After receiving labels assigned by the user, suggesting labels, and receiving feedback regarding the suggested labels, additional faces are activated. While the first activated faces are being processed, face pre-processor module 900 continues to process images and new information is added to compact cache 1002 as those faces are received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method, comprising:
    performing face detection, using a processor, on a plurality of images to identify a plurality of faces;
    activating a subset of the plurality of faces, including by loading data associated with the subset of faces into a processing memory, wherein at least one of the plurality of faces is un-activated, including by keeping data associated with the at least one of the plurality of faces out of the processing memory;
    calculating a distance for each pair of activated faces, wherein the distance is associated with a measure of a similarity between a first face and a second face;
    clustering the activated faces into a plurality of groups based at least in part on the distances;
    reducing an amount of information loaded in the processing memory, including by modifying data associated with at least one of the plurality of groups; and
    after reducing, activating at least one un-activated face, including by loading data associated with the at least one un-activated face into the processing memory.

2. The method of claim 1, where activating the subset is initiated when face detection has completed for one or more of the following: a predefined number of images or for a predefined number of faces.

3. The method of claim 1, wherein activating the subset is based at least in part on one or more of the following: whether another face in the same image is activated, whether another face having a similar timestamp is activated, whether an image is selected by a user, or if a face has better quality information than another face.

4. The method of claim 1, wherein activating the subset includes activating a predefined number of faces.

5. The method of claim 1, wherein calculating the distance includes: in the event a first face is associated with a first label and a second face is associated with a second label, which is different from the first label, setting a distance between the first face and the second face to one or more of the following: an infinite value or a maximum value.

6. The method of claim 1, wherein calculating the distance includes: in the event a first face and a second face are associated with a same image, setting a distance between the first face and the second face to one or more of the following: an infinite value or a maximum value.

7. The method of claim 1 further comprising receiving at least one label in response to displaying.

8. The method of claim 7 further comprising displaying an unlabeled face with a suggested label.

9. The method of claim 7 further comprising reducing an amount of information associated with a first face and a second face that are assigned a same label.

10. The method of claim 9, wherein reducing the amount of information includes generating composite information based at least in part on information associated with the first face and information associated with the second face.

11. The method of claim 9, wherein reducing the amount of information includes:
selecting either information associated with the first face or information associated with the second face;
retaining the selected information; and
discarding the unselected information.

12. A system, comprising:
a processor; and
a memory coupled with the processor, wherein the memory is configured to provide the processor with instructions which when executed cause the processor to:
perform face recognition processing on a plurality of images to identify a plurality of faces;
activate a subset of the plurality of faces, including by loading data associated with the subset of faces into a processing memory, wherein at least one of the plurality of faces is un-activated, including by keeping data associated with the at least one of the plurality of faces out of the processing memory;
calculate a distance for each pair of activated faces, wherein the distance is associated with a measure of a similarity between a first face and a second face;
cluster the activated faces into a plurality of groups based at least in part on the distances;
reduce an amount of information loaded in the processing memory, including by modifying data associated with at least one of the plurality of groups; and
after reducing, activate at least one un-activated face, including by loading data associated with the at least one un-activated face into the processing memory.

13. The system of claim 12, wherein activating is based at least in part on one or more of the following: whether another face in the same image is activated, whether another face having a similar timestamp is activated, whether an image is selected by a user, or if a face has better quality information than another face.

14. The system of claim 12, wherein the instructions for calculating the distance include instructions for: in the event a first face is associated with a first label and a second face is associated with a second label which is different from the first label, setting a distance between the first face and the second face to one or more of the following: an infinite value or a maximum value.

15. The system of claim 12, wherein the instructions for calculating the distance include instructions for: in the event a first face and a second face are associated with a same image, setting a distance between the first face and the second face to one or more of the following: an infinite value or a maximum value.

16. A computer program product the computer program product being embodied in a non-transitory computer readable storage medium and comprising computer instructions for:
performing face recognition processing, on a plurality of images to identify a plurality of faces;
activating a subset of the plurality of faces, including by loading data associated with the subset of faces into a processing memory, wherein at least one of the plurality of faces is un-activated, including by keeping data associated with the at least one of the plurality of faces out of the processing memory;
calculating a distance for each pair of activated faces, wherein the distance is associated with a measure of a similarity between a first face and a second face;
clustering the activated faces into a plurality of groups based at least in part on the distances;
reducing an amount of information loaded in the processing memory, including by modifying data associated with at least one of the plurality of groups; and
after reducing, activating at least one un-activated face, including by loading data associated with the at least one un-activated face into the processing memory.

17. The computer program product of claim 16 further comprising computer program instructions for:
receiving at least one label in response to displaying; and
reducing an amount of information associated with a first face and a second face that are assigned a same label.

18. The computer program product of claim 17, wherein reducing the amount of information includes:
selecting either information associated with the first face or information associated with the second face;
retaining the selected information; and
discarding the unselected information.

* * * * *